United States Patent
Atkinson

(10) Patent No.: US 12,420,218 B1
(45) Date of Patent: Sep. 23, 2025

(54) POOL WATER FILTRATION SYSTEM AND RELATED METHODS

(71) Applicant: Com Pac Filtration, Inc., Jacksonville, FL (US)

(72) Inventor: Dean M. Atkinson, Jacksonville, FL (US)

(73) Assignee: Com Pac Filtration, Inc., Jacksonville, FL (US)

( * ) Notice: Subject to any disclaimer, the term of this patent is extended or adjusted under 35 U.S.C. 154(b) by 365 days.

(21) Appl. No.: 17/974,458

(22) Filed: Oct. 26, 2022

Related U.S. Application Data

(60) Provisional application No. 63/271,819, filed on Oct. 26, 2021.

(51) Int. Cl.
| | |
|---|---|
| *B01D 29/66* | (2006.01) |
| *B01D 29/52* | (2006.01) |
| *B01D 29/60* | (2006.01) |
| *C02F 1/00* | (2023.01) |
| *C02F 1/40* | (2023.01) |
| *C02F 103/42* | (2006.01) |

(52) U.S. Cl.
CPC .............. *B01D 29/66* (2013.01); *B01D 29/52* (2013.01); *B01D 29/60* (2013.01); *C02F 1/001* (2013.01); *C02F 1/40* (2013.01); *C02F 2103/42* (2013.01); *C02F 2201/005* (2013.01); *C02F 2209/40* (2013.01); *C02F 2303/16* (2013.01)

(58) Field of Classification Search
CPC ........ B01D 29/66; B01D 29/52; B01D 29/60; C02F 1/001; C02F 1/40; C02F 2103/42; C02F 2201/005; C02F 2209/40; C02F 2303/16; C02F 2301/046; E04H 4/1218; E04H 4/1645
See application file for complete search history.

(56) References Cited

U.S. PATENT DOCUMENTS

| | | | | |
|---|---|---|---|---|
| 3,581,895 | A * | 6/1971 | Howard | B01D 24/14 |
| | | | | 210/138 |
| 6,022,481 | A * | 2/2000 | Blake | E04H 4/1645 |
| | | | | 210/776 |
| 9,428,929 | B2 * | 8/2016 | Prendergast | E04H 4/1272 |
| 11,111,683 | B1 * | 9/2021 | Tapley | E04H 4/1218 |

* cited by examiner

*Primary Examiner* — Terry K Cecil
(74) *Attorney, Agent, or Firm* — Allen, Dyer, Doppelt & Gilchrist, P.A.

(57) ABSTRACT

A pool water filtration system includes a plurality of skimmer assemblies in fluid communication with a sludge removal assembly and automatically operable to periodically backflush filters of each of the skimmer assemblies to the sludge removal assembly.

14 Claims, 4 Drawing Sheets

NORMAL OPERATION

FILTER #1 BACKWASH 5 MIN OPERATION

FILTER #2 BACKWASH 5 MIN OPERATION

120

POOL WATER FILTRATION SYSTEM AND RELATED METHODS

CROSS-REFERENCE TO RELATED APPLICATION

This application claims the benefit of U.S. Provisional Patent Application Ser. No. 63/271,819, filed on Oct. 26, 2021, the contents of which are herein incorporated by reference in their entirety.

FIELD OF THE INVENTION

The present invention relates to the filtration of pool water, and more particularly, to the backflushing of filters used in skimmer systems.

BACKGROUND OF THE INVENTION

Pool water filtration systems in which water is pumped from a skimmer located along an edge of the pool through one or more filters and then re-supplied to the pool are well known. A common requirement of many such systems is the periodic backflushing of the filter(s) to remove solids accumulated thereon and prevent an unacceptable decrease in flow through the system. This process is time and labor intensive, generally requiring the filtration system to be taken off service and resulting in the loss of pool water required to perform the backflushing. As a consequence, while it may otherwise be desirable, it can be impractical to have a large public swimming pool serviced by a large number of skimmers due to the multiplication of the required labor and water consumption.

SUMMARY OF THE INVENTION

In view of the foregoing, it is an object of the present invention to provide an improved pool water filtration system. According to an embodiment of the present invention, the pool water filtration system includes a plurality of skimmer assemblies in fluid communication with a sludge removal assembly and automatically operable to periodically backflush filters of each of the skimmer assemblies to the sludge removal assembly.

These and other objects, aspects and advantages of the present invention will be better appreciated in view of the drawings and following detailed description of preferred embodiments.

DETAILED DESCRIPTION OF PREFERRED EMBODIMENTS

Figure 1:
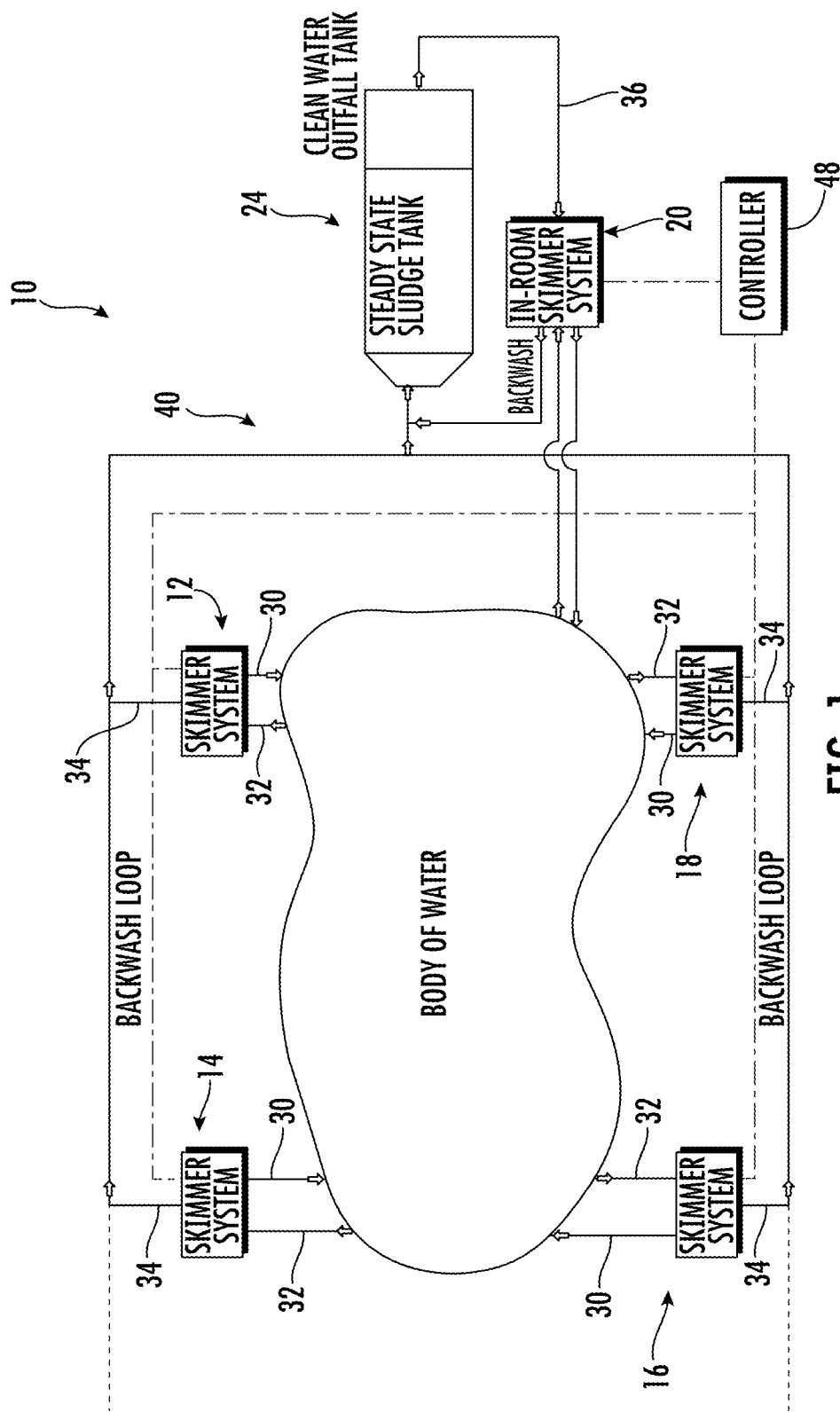
FIG. 1 is a schematic overview of a pool water filtration system including a plurality of skimmer systems and a sludge removal assembly, according to an embodiment of the present invention.

According to an embodiment of the present invention, referring to FIG. 1, a pool water filtration system 10 includes a plurality of skimmer systems 12, 14, 16, 18, 20 and a sludge removal assembly 24. The plurality of skimmer systems 12-20 are in fluid communication with a swimming pool 26 via respective discharge and suction lines 30, 32, as well as with the sludge removal assembly 24 via backflush lines 34 connecting to a backflush circuit 40. As will be explained in greater detail below, each of the skimmer systems 12-20 is configured to periodically backflush to the sludge removal assembly 24 via the backflush circuit 40. Backflushed water cleaned by the sludge removal assembly 24 is supplied to the skimmer system 20 via a clean water supply line 36 and from thence to the swimming pool 26.

Figure 2A:
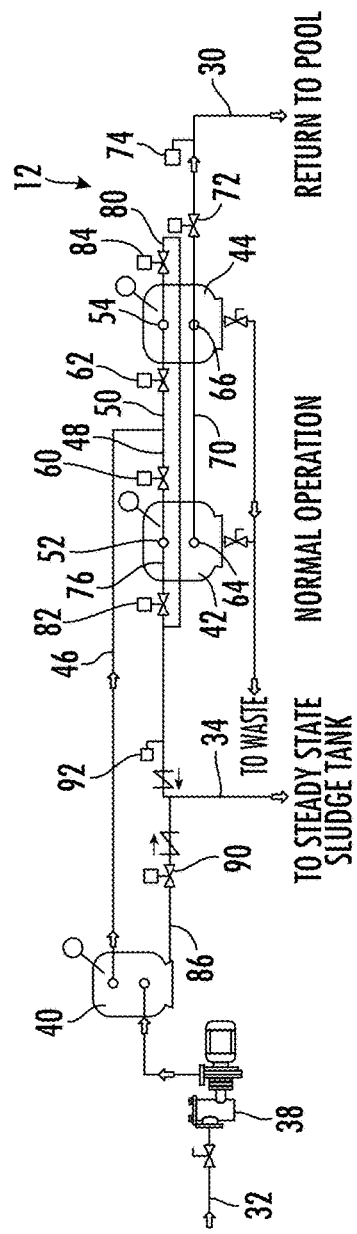
FIGS. 2A-2C are schematic overviews of a representative one of the skimmer assemblies of FIG. 1, in different modes of operation.

Referring to FIG. 2A, the skimmer system 12 includes a pump 38, a pre-filter 40 and first and second main filters 42, 44. The skimmer systems 14-18 are advantageously identical in components and function to the skimmer system 12 as described herein and need not be separately illustrated or described. The pump 38 takes a suction on the on the swimming pool 26 via the suction line 32 and supplies pool water to the main filters 42, 44 through the pre-filter 40 via a filter inlet line 46 which splits into first and second filter inlet branches 48, 50 leading to first and second filter inlets 52, 54, respectively. Solenoid-operated first and second filter inlet valves 60, 62 located in the first and second filter inlet branches 48, 50, respectively, are operable to allow and prevent flow therethrough.

First and second filter outlets 64, 66 connect to the discharge line 30 through a branched outlet line 70. A solenoid-operated outlet valve 72 located between the branched outlet line 70 and the discharge line 30 is operable to allow and prevent flow from the outlet line 70 back to the swimming pool 26 through the discharge line 30. A discharge flow transducer 74 is operable to measure water flow through the discharge line 30.

The first and second filter inlets 52, 54 also connect to the backflush line 34 through first and second backflush branches 76, 80. Solenoid-operated first and second backflush control valves 82, 84 located in the first and second backflush branches 76, 80, respectively, are operable to allow and prevent flow therethrough. The pre-filter 38 also connects to the backflush line 34 through a pre-filter flush line 86 including a solenoid-operated pre-filter flush control valve 90. A backflush flow transducer 92 is operable to measure water flow through the backflush line 34.

During normal operation of the skimmer system 12, The first and second filter inlet valves 60, 62 are open along with the outlet valve 72. The first and second backflush control valves 82, 84 and the pre-filter flush control valve 90 are closed. Consequently, water flow drawn from the pool 26 by the pump 38 via the suction line 32 will pass through the pre-filter 40, the filter inlet line 46, and the first and second filter inlet branches 48, 50 to the first and second filter inlets 52, 54. The water flow passes through the first and second main filters 42, 44 in parallel and from thence out the first and second filter outlets 64, 66, through the branched outlet line 70 to the discharge line 30 and back to the pool 26.

A controller 98, preferably including at least one microprocessor and machine readable memory, is configured with software instructions to periodically flush the pre-filter 40 during normal operation (e.g., one minutes every 1.5 to 2 hours) by opening the pre-filter flush control valve 90. A portion of the water flow from the pump 38 is then directed through the pre-filter flush line 86 to the backflush line 34. The same controller can be used for all the skimmer systems 12-20, or each system 12-20 could be provided with its own controller.

The controller is also configured to separately backflush each of the first and second main filters 42, 44. This can be done automatically according to a predetermined schedule and/or based on sensed criteria. For example, the controller could automatically initiate backflushing based on sensed flow from the discharge flow transducer 74 dropping below a predetermined level.

Figure 2B:
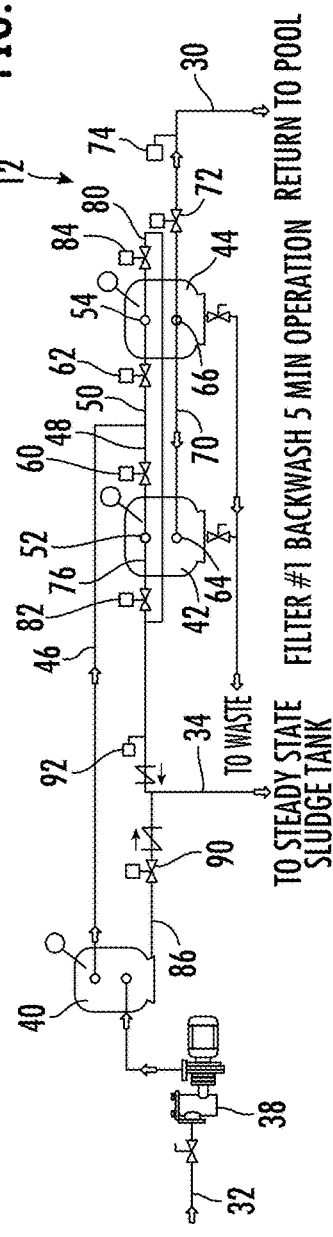

Referring to FIG. 2B, to backflush the first main filter 42, the controller shuts the first filter inlet valve 60 and the outlet valve 72 while opening the first backflush control valve 82. Water from the filter inlet line 46 then passes through only the second filter inlet branch 50 through the second main filter 42 from its inlet 54 to its outlet 66. With the outlet valve 72 closed, the water flow passes through branched outlet line 70 into the first main filter outlet 64, backflushing the first main filter 40 and passing from the first filter inlet 52 to the backflush line 34.

Figure 2C:
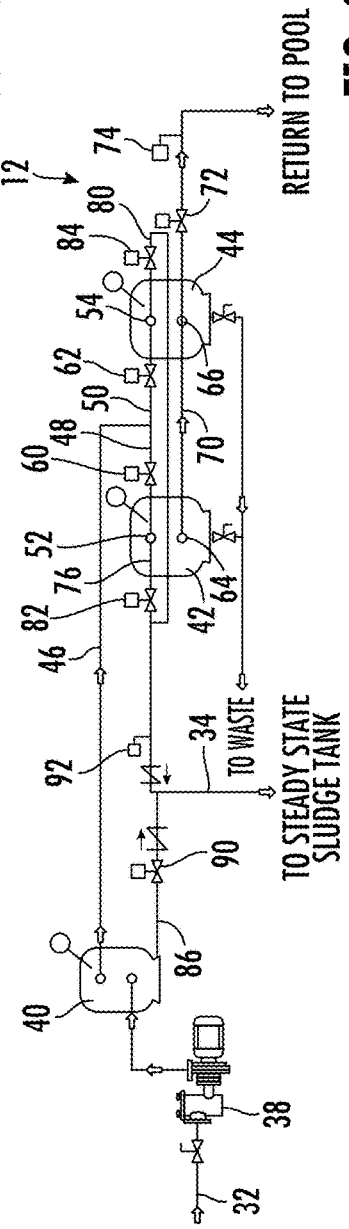

Referring to FIG. 2C, to backflush the second main filter 44, the controller leaves the outlet valve 72 closed while opening the first filter inlet valve 60 and the second backflush control valve 84 and closing the second filter inlet valve 54 and the first backflush control valve 82. Water from the filter inlet line 44 then passes through only the first filter inlet branch 48, the first main filter 42 from its inlet 52 to its outlet 64. The water flow now enters the second filter outlet 66 through the branched outlet line 70 and backflushes the second main filter 44, passing out the second filter inlet 54 and from thence to the backflush line 34. The foregoing describes switching from backflushing the first main filter 40 to backflushing the second main filter 42. It will be appreciated that backflushing the second main filter 42 could be initiated directly from normal operation, if desired.

Normal operation is resumed by restoring the normal operation valve positions with both first and second inlet valves 60, 62 and the outlet valve 72 open and both first and second backflush control valves 82, 84 closed. The controller could backflush each main filter 40, 42 for a predetermined time or pursuant to a sensed condition. For example, the controller could continue each backflush until a predetermined increase in flow is sensed by the backflush flow transducer 92.

Figure 3A:
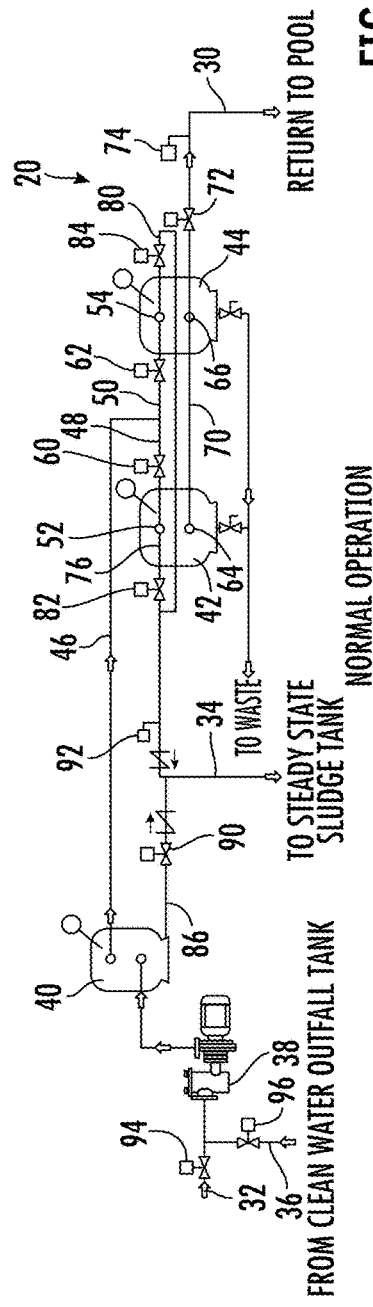
FIGS. 3A-3C are schematic overviews of another one of the skimmer assemblies of FIG. 1, in different modes of operation.
Figure 3B:
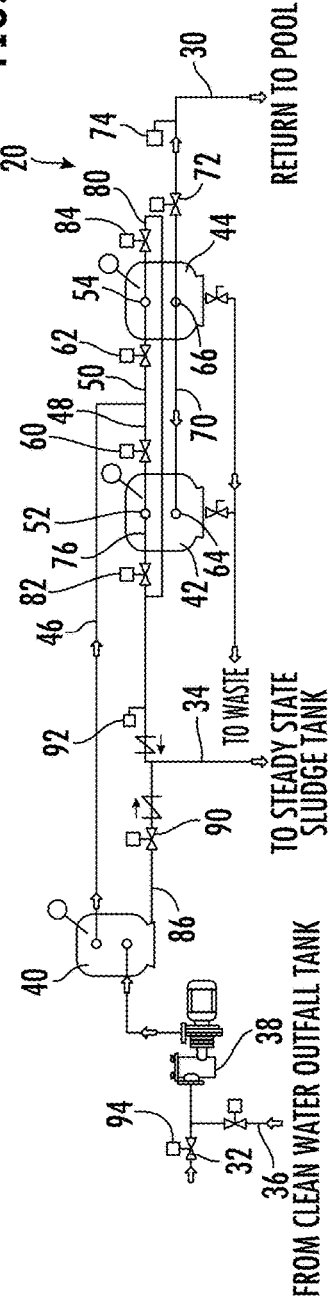
Figure 3C:
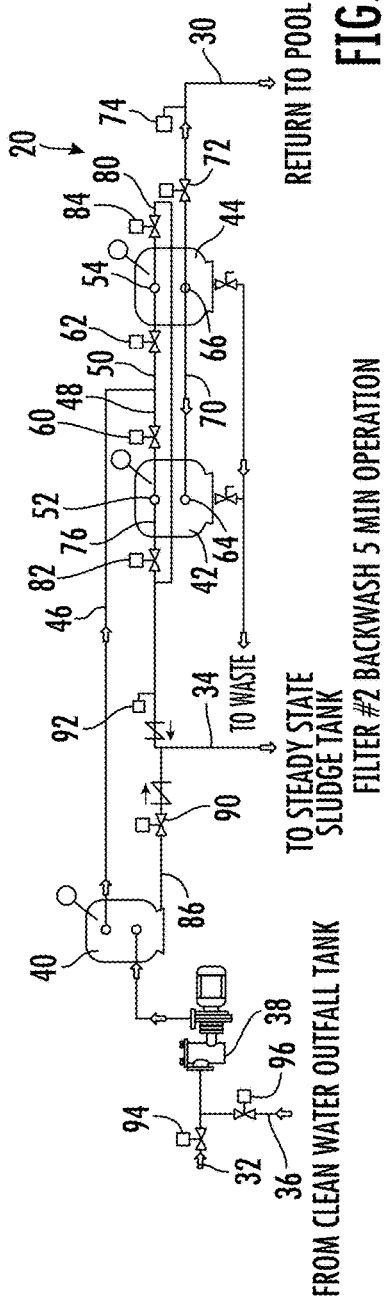

Referring to FIGS. 3A-3C, the skimmer system 20 differs from the skimmer systems 12-18 only in that, in addition to its respective suction line 32, the suction side of the pump 38 is connectable to the clean water supply line 32 from the sludge removal assembly 24. Solenoid-operated suction line valve 94 and clean water supply valve 96 are operable by the controller to select the source of water supplied to the pump 38.

The operation of the valves 60, 62, 72, 82, 84 and 90 by the controller is as described above in connection with the skimmer system 12 for normal operation, pre-filter 40 flushing and backflushing the first and second main filters 42, 44. However, as needed to control the level of clean water in the sludge removal assembly 24, the controller opens the clean water supply valve 96 and closes the suction line valve 94.

Figure 4:
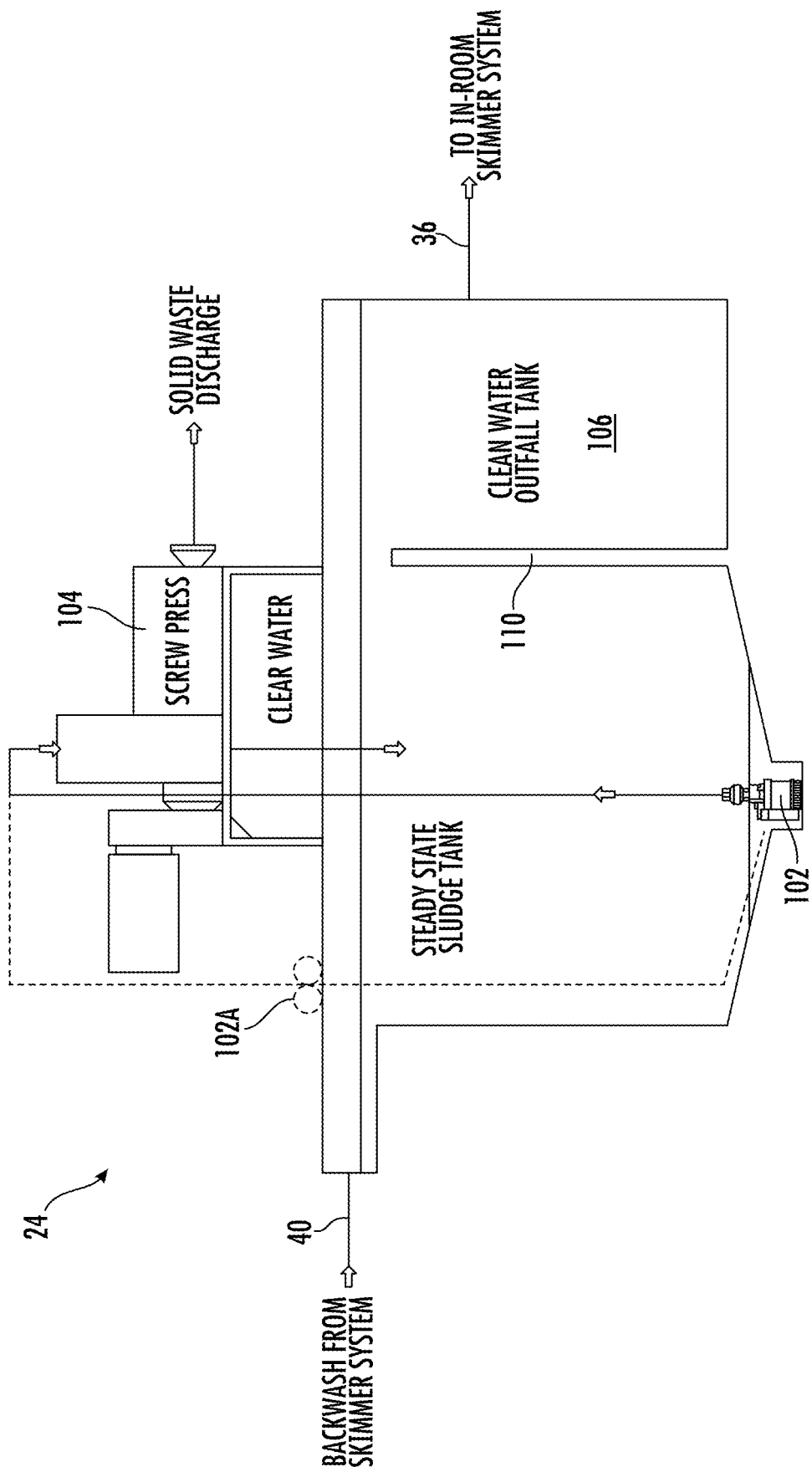
FIG. 4 is a schematic elevational view of the sludge removal assembly of FIG. 1.

Referring to FIG. 4, the sludge removal assembly 24 includes a sludge settling tank 100 which receives the pre-filter 40 flush flow and first and second main filter 42, 44 backflush flow for each of the skimmer systems 12-20. A sludge pump 102 is located in the bottom of the settling tank 100 is operable to pump the settled sludge therefrom to a screw press 104. Alternatively, a sludge pump 102A (shown in broken lines) located externally to the settling tank 100 could be used. The screw press 104 separates solid waste for discharge and disposal and returns clean water to the sludge settling tank 100. A clean water outfall tank 106 is separated from the sludge settling tank 100 by a partition such that only clean water from the top of tank 10 can pass to the outfall tank 106. The clean water supply line 36 is connected to the outfall tank 106.

It will be appreciated that, aside from the periodic disposal of the solid waste discharged by the sludge removal assembly, a pool water treatment assembly according to the present invention can be operated essentially autonomously for long periods of time with very little water loss and filter downtime. Consequently, a large volume public swimming pool with multiple skimmers can be realized with a fraction of the time, labor and water use that filtration system maintenance would normally require.

The above-described embodiments are provided for illustrative purposes; the present invention is not necessarily limited thereto. Rather, those skilled in the art will appreciate that various modifications, as well as adaptations to particular circumstances, will fall within the scope of the invention herein shown and described and of the claims appended hereto.

What is claimed is:

1. A pool water filtration system comprising:
   a body of water to be filtered;
   a sludge removal assembly;
   a backflush circuit connected to the sludge removal assembly;
   a plurality of skimmer systems connected to the body of water by respective suction and discharge lines and the backflush circuit by respective backflush lines, each of the skimmer systems including:
   a pump connected to the suction line;
   a first main filter connected between the pump and the discharge and backflush lines; and
   a plurality of flow control valves operable to selectively route water forwards through the first main filter to the discharge line and backwards through the first main filter to the backflush line; and
   a controller configured to operate the plurality of flow control valves to periodically backflush the first main filters to the sludge removal assembly via the backflush circuit.

2. The system of claim 1, wherein at least one of the skimmer systems is connected to the sludge removal assembly by a clean water supply line and the flow control valves of the at least one skimmer system includes a clean water supply valve operable by the controller to supply clean water from the sludge removal assembly to the pump.

3. The system of claim 1, wherein each of the plurality of skimmer systems further includes a second main filter connected between the pump and the discharge and backflush lines and the plurality of flow control valves are operable selectively route water forwards through the first and second main filters in parallel to the discharge line, forwards through the second main filter and backwards through the first main filter in series to the backflush line, and forwards through the first main filter and backwards through the second main filter in series to the backflush line; and
   wherein the controller is configured to operate the plurality of flow control valves to periodically backflush the first and second main filters to the sludge removal assembly via the backflush circuit.

4. The system of claim 3, wherein each of the plurality of skimmer systems further includes a pre-filter connected between the pump and the first and second main filters.

5. The system of claim 4, wherein the pre-filter is also connected to the backflush line and the plurality of flow control valves includes a pre-filter flush control valve operable to selectively route water through the pre-filter to the backflush line; and wherein the controller is further configured to periodically operate the pre-filter flush control valves to flush the pre-filter.

6. The system of claim 4, wherein the pump is connected to the first and second main filters via a filter inlet line and first and second filter inlet branches leading to first and second main filter inlets, respectively, first and second main filter outlets are connected to the discharge line through a branched outlet line and also respectively connected to the backflush line via first and second backflush branches.

7. The system of claim 6, wherein the plurality of flow control valves include first and second filter inlet valves located in the first and second filter inlet branches, respectively, an outlet valve located between the branched outlet line and the discharge line, and first and second backflush control valves located in the first and second backflush branches, respectively.

8. The system of claim 7, wherein the plurality of flow control valves are solenoid-operated valves.

9. The system of claim 8, wherein, during normal operation of each of the plurality of skimmer systems, the first and second filter inlet valves and the outlet valve are open and the first and second backflush control valves are closed; and wherein the controller is configured to close the first filter inlet valve and the outlet valve, and open the first backflush control valve to backflush the first main filter, and open the first filter inlet valve and the second backflush control valve, and close the second filter inlet valve and first backflush control valve to backflush the second main filter.

10. The system of claim 1, wherein at least one of the skimmer systems is connected to the sludge removal assembly by a clean water supply line and the flow control valves of the at least one skimmer system includes a clean water supply valve operable by the controller to supply clean water from the sludge removal assembly to the pump; and wherein the sludge removal assembly includes a sludge settling tank which receives backflush flow from each of the plurality of skimmer systems through the backflush circuit and a clean water outfall tank separated from the sludge settling tank such that only clean water from the top of the sludge settling tank passed to the clean water outfall tank, the clean water supply line connecting to the clean water outfall tank.

11. The system of claim 10, wherein the sludge removal assembly further includes a sludge pump operable to pump settled sludge from the bottom of the sludge settling tank.

12. The system of claim 11, further comprising a screw press that receives the sludge from the sludge pump and separates solid waste therefrom.

13. The system of claim 12, wherein the screw press returns water from which the solid waste has been separated to the sludge settling tank.

14. A pool water filtration system comprising:
a body of water to be filtered;
a sludge removal assembly;
a backflush circuit connected to the sludge removal assembly;
a plurality of skimmer systems connected to the body of water by respective suction and discharge lines and the backflush circuit by respective backflush lines, each of the skimmer systems including:
    a pump connected to the suction line;
    first and second main filters connected between the pump and the discharge and backflush lines; and
    a plurality of flow control valves operable to selectively route water forwards through the first and second main filters to the discharge line, forwards through the second main filter and backwards through the first main filter to the backflush line, and forwards through the first main filter and backwards through the second main filter to the backflush line; and
a controller configured to operate the plurality of flow control valves to periodically backflush the first main filters to the sludge removal assembly via the backflush circuit;
    wherein at least one of the skimmer systems is connected to the sludge removal assembly by a clean water supply line and the flow control valves of the at least one skimmer system includes a clean water supply valve operable by the controller to supply clean water from the sludge removal assembly to the pump.

\* \* \* \* \*